Aug. 6, 1940.　　　W. B. DEAN　　　2,210,798
RAIL CAR TRUCK
Original Filed July 9, 1934　　4 Sheets-Sheet 1

INVENTOR.
WALTER B. DEAN.
BY
John P. Tarbox
ATTORNEY.

Aug. 6, 1940.   W. B. DEAN   2,210,798
RAIL CAR TRUCK
Original Filed July 9, 1934   4 Sheets-Sheet 2

INVENTOR.
WALTER B. DEAN.
BY
John P. Bakex
ATTORNEY.

Aug. 6, 1940.    W. B. DEAN    2,210,798
RAIL CAR TRUCK
Original Filed July 9, 1934    4 Sheets-Sheet 3

INVENTOR.
WALTER B. DEAN.
BY
ATTORNEY.

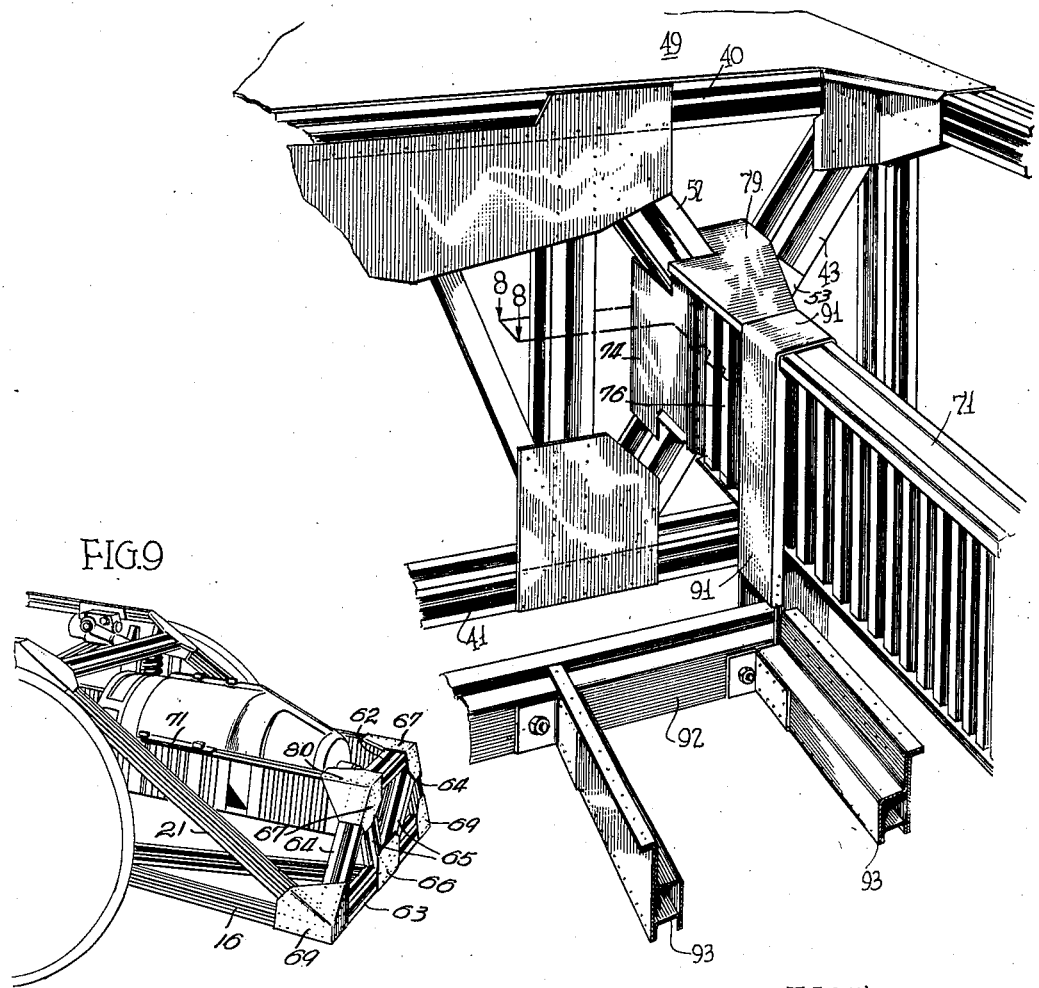
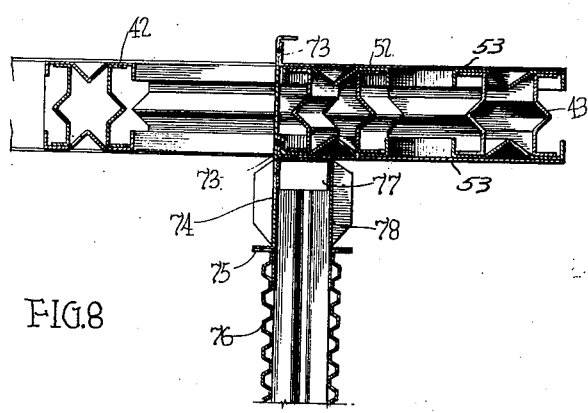
FIG.9
FIG.7
FIG.8
INVENTOR.
WALTER B. DEAN
ATTORNEY.

Patented Aug. 6, 1940

2,210,798

UNITED STATES PATENT OFFICE 2,210,798

RAIL CAR TRUCK

Walter B. Dean, Philadelphia, Pa., assignor to Edward G. Budd Manufacturing Company, Philadelphia, Pa., a corporation of Pennsylvania Application July 9, 1934, Serial No. 734,271
Renewed November 2, 1936

34 Claims. (Cl. 105—34)

The invention relates to trucks for rail cars and particularly to light such trucks adapted for use with light bodies but of a size having a passenger carrying capacity of 40 to 70 or more passengers and adapted to be supported on wheels equipped with pneumatic tires.

It is among the objects of the invention to provide a truck of this class which is materially lighter in weight than existing such trucks, one which is easy of fabrication and assembly, compact of construction, one which permits the balanced mounting of the power plant for driving the car with which it is used thereon, and one which is so constructed as to permit the mounting of the power plant almost wholly between the sides of the side frames.

These objects are attained in large part by constructing the entire truck of trussed framing built up of members fabricated from high tensile stainless steel stock, the fabrication of the parts being facilitated by reason of the fact that most of the parts entering into the construction are made of uniform rolled or stamped sections, in the assembly of these parts into box section members having flat sides, and edge conformations permitting easy access for spot welding tools, and the joinder of these members almost wholly by that simplest of methods of joinder, namely, spot welding. Compactness of construction is attained by the arrangement of the trussing so as to leave the space between the side frames of the truck open to receive between the side frames the main elements of the power plant, and a balanced arrangement of the power plant about the center of the truck by arranging the internal combustion motor at one end of the truck, and other parts of the power plant, such as storage batteries and generator, adjacent the opposite end. The trussing of the side, end, bolster and bottom frames of the truck is so arranged as to obtain maximum of space, yet without sacrifice of the necessary strength required. To add to the space between the side frames of the truck, the axles have their central portions offset downwardly. The side frames are constructed with a minimum of weight by the particular trussed construction utilized, and the end and bolster beams are each tied strongly into the side frames and utilized to form supports for the various elements of the power plant.

Other and further objects and advantages and the manner in which they are attained will become apparent from the following detailed description when read in connection with the accompanying drawings forming a part of this specification.

In the drawings,

Figure 7 is a fragmentary detail perspective view showing the connection of the auxiliary beams to the bolster beam structure and the battery support suspended from the auxiliary beams.

Figure 8 is a detail sectional plan view, the section being taken approximately along the line indicated by the section line 8—8, in Fig. 7 as it would appear when looking in the direction of the arrows.

Figure 9 is a fragmentary perspective view of the rear end framing of the truck.

Figures 1, 2:
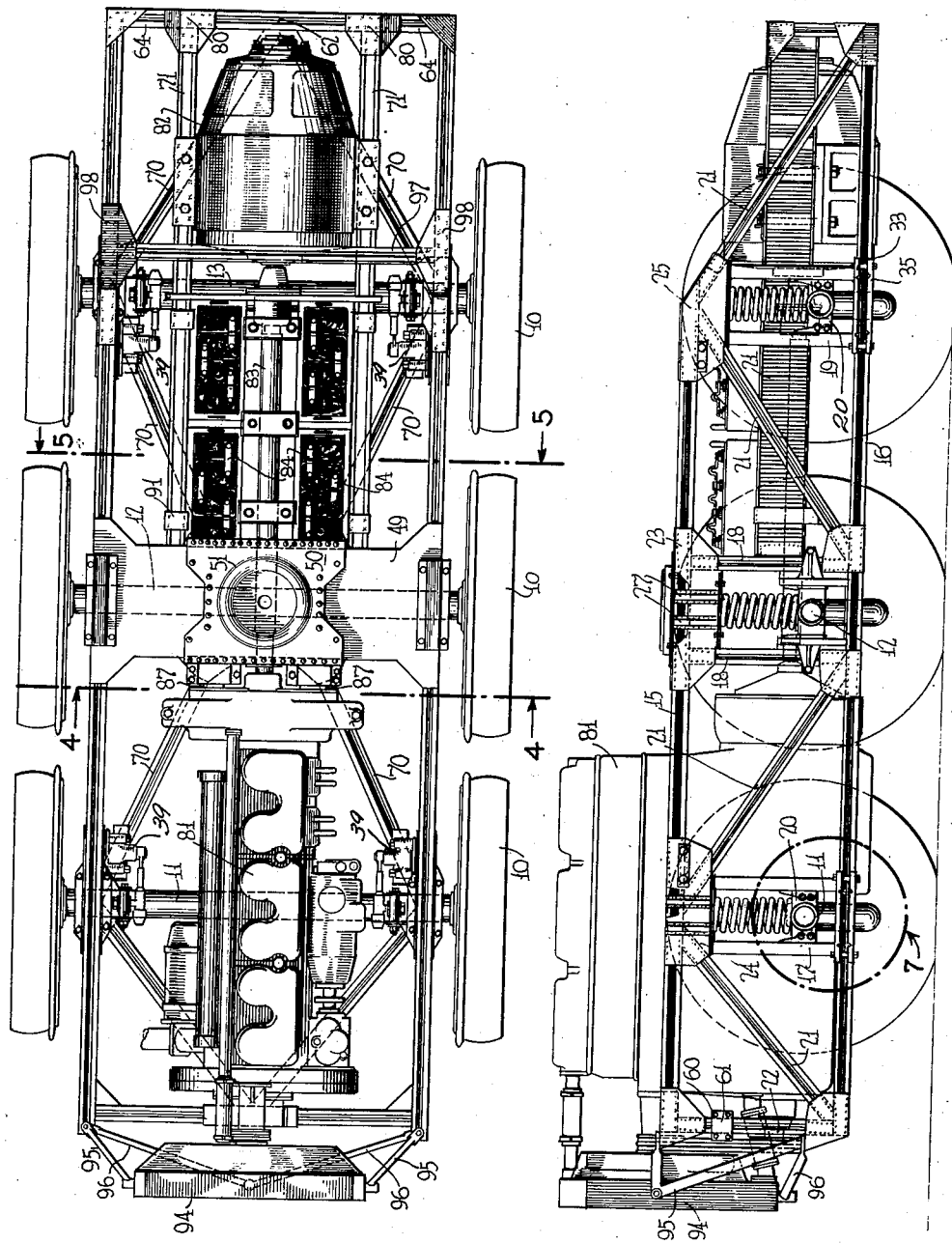
Figure 1 is a side elevational view of a truck according to the invention, showing the main elements of the power plant mounted thereon.
Figure 2 is a plan view thereof.

The truck according to the invention, as appears from Figures 1 and 2, is supported on six wheels 10 equipped with pneumatic tires through the intermediary of three axles designated, respectively, from front to rear 11, 12 and 13, which axles extend through the side frames of the truck and support the truck frame and the load carried thereby through the coil springs 14 arranged between the axles and the upper portions of the side frames.

The side frames, the transverse bolster beam connecting the central portions of the side frames and the end beams form the main truss members of the frame, and are each constructed as truss structures designed to carry the load required but of a minimum weight consistent with an adequate factor of safety. Each side frame truss comprises an upper chord 15 and a lower chord 16, and vertical and diagonal webbing interconnecting the chords. The vertical webbing comprises spaced pedestals 17, 18 and 19 arranged in pairs, between each of which pairs is guided one of the three axles through the axle guiding blocks, as 20 rigidly secured to the axles.

The diagonal webbing comprises the members 21 extending in opposite directions from the upper chord 15, which terminates at the rear pedestal 19 short of the bottom chord, from points adjacent the tops of the two endmost pedestals to points on the bottom chord, the members 21 extending inwardly from the tops of the endmost chords terminating on the bottom chord adjacent the bottom of the central pedestal 18.

At the front end, the top and bottom chords terminate in a common vertical plane, and are there interconnected by a vertical beam 22.

Figure 3:
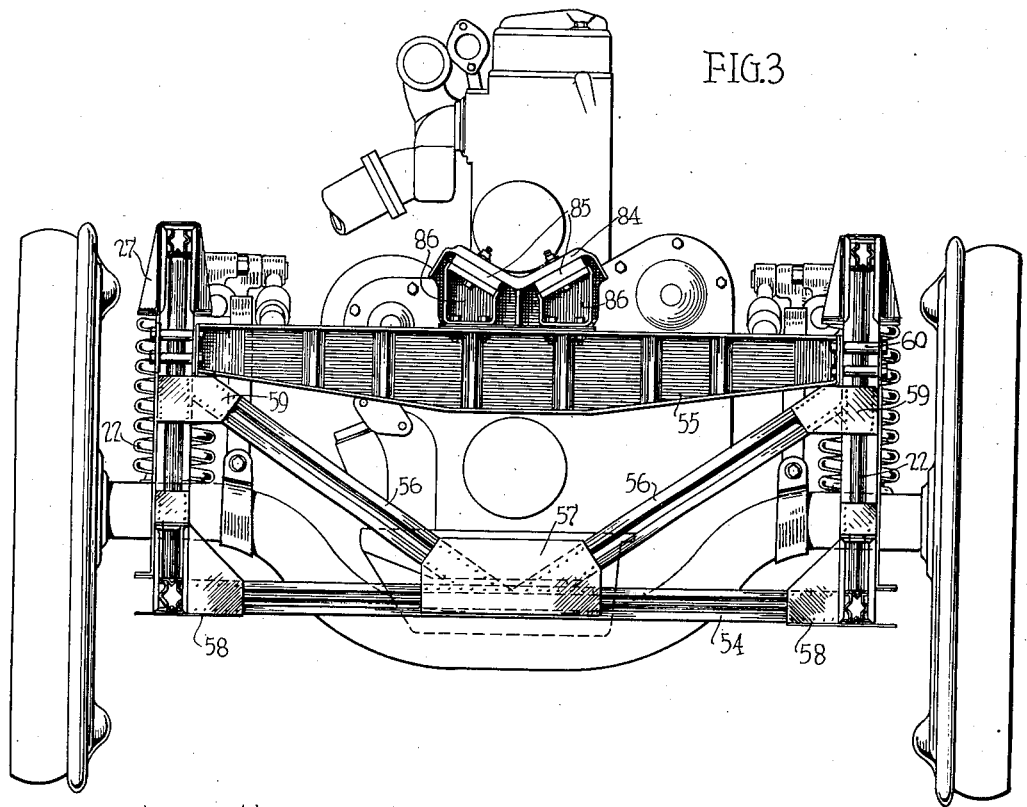
Figure 3 is a front end elevational view thereof.
Figure 4:
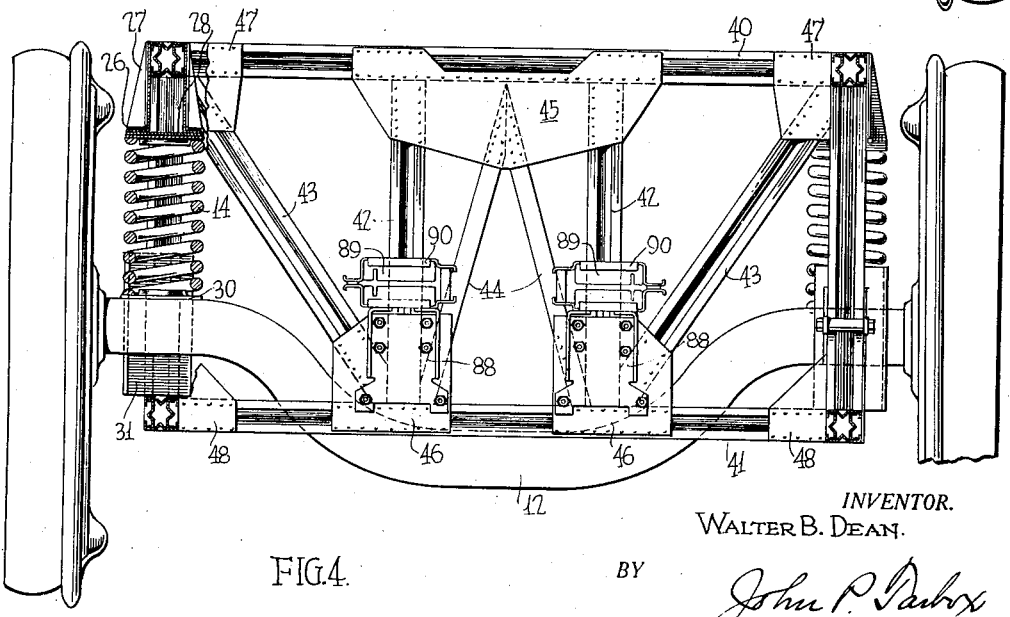
Figure 4 is a transverse sectional view, the section being taken approximately on the line 4—4 of Fig. 2 but with the motor omitted, and the view being seen as it would appear looking in the direction of the arrows at the ends of the section line.
Figure 5:
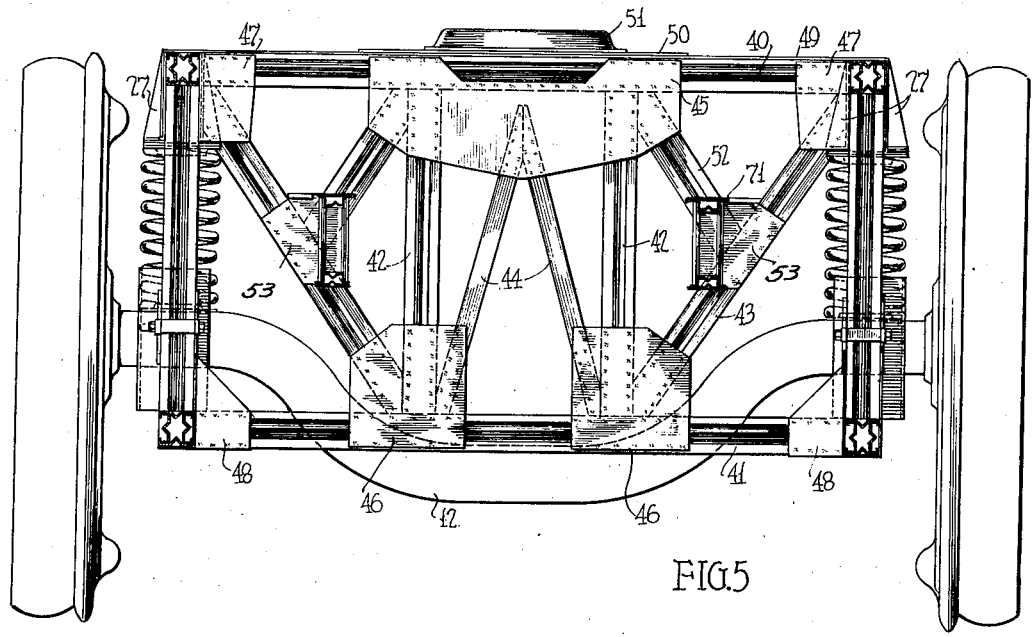
Figure 5 is a similar view taken substantially along the line 5—5 of Figure 2 and with the power plant parts omitted.

The structural elements entering into the side frame trusses, and indeed, into most of the structure of the truck frame, are, as appears most clearly in the end and transverse sectional views of Figs. 3, 4 and 5 which clearly show the transverse cross section of the top and bottom chords of the side frames and in the detail sectional view of Fig. 8, box section members built up of four channel members, of a depth less than their width, these members being reinforced and strengthened by a central rib or groove in their bottom walls. The members of these box section elements are readily secured together in the relation shown by spot welding and when so joined, the resulting elements form strong beam and/or strut structures adapted to take heavy compression, tension and bending loads. The four sides of these box sections structures are relatively flat faced surfaces against which, at their points of joinder, flat gussets can be readily fitted and secured by spot welding them either to the side walls of the two inwardly facing channels or to the double thickness metal where the side walls of the two outwardly facing channels are secured to the bottom walls of the inwardly facing channels.

Thus, it will be seen that the elements out of which the side frame trusses are in large measure constructed are well adapted for joinder and are joined in their meeting portions by generous gussets which overlap the side walls of two or more of the meeting elements and are rigidly secured thereto by welding to the open edge flanges formed by the channels entering into the structure of these elements.

At the top of the side frames, a gusset 23 interconnects the top chord 15 and the central pair of pedestal members 18 and gussets 24 and 25 interconnect respectively the top chords, the diagonals 21 and the end pairs of pedestal members 17 and 18. These gussets 23 and 24 and 25 are flanged in their lower edges, as shown at 26, Fig. 4, and they are further reinforced over the spring location, each by a pair of flanged channel members, 27 of tapered form, see Figs. 1, 3 and 4, which are secured to the gussets by spot welding through the flanges of the channels.

As shown in Fig. 4, the flanges 26 of the gussets on opposite sides of the side frame, are interconnected by a reinforcing plate 28 and to the margins of this reinforced structure is connected a centering plate 29 for the upper end of the spring 14. The lower end of the spring 14 is retained by a centering plate 30 secured to the central axle 12. As shown in Fig. 1, the center pair of pedestal members 18 are spaced apart further than the end pedestal members 17 and 19 and are provided at their lower ends with liners 31 removably secured thereto by bolts (see Fig. 4) and forming the ways in which the axle guiding block 20 may slide. There is a certain amount of axial play between these parts to permit the slight axial movement required of the central axle in rounding a sharp curve.

Figure 6:
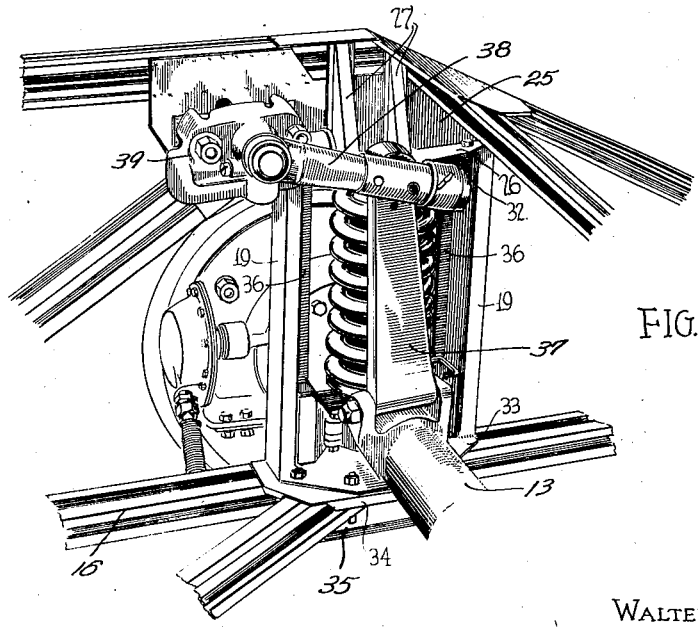
Figure 6 is a fragmentary detail perspective view showing the axle suspension means and the structure of the truck in the region of an axle.

To permit ready removal of the end pedestal members, they are rigidly secured at top and bottom, see Fig. 6, to plates 32 and 33, respectively, which plates are in turn secured as by bolts to the reinforced edge flanges 26 of the top outer and inner gussets 25 and to bottom chord 16 of the side frame by bolts passing through the plates 33, gussets 34 connecting the lower chord to diagonals of the bottom frame and plates 35 opposed to the plates 33 and arranged on the bottom side of the chords. Suitable spacers are provided between the plates and surrounding the bolts. This method of attachment avoids piercing the main structural members of the chords by bolt holes and preserves the full strength of the structure, while permitting lateral removal of the end pedestals by removing the securing bolts when for any reason such removal is desired.

By reference to Fig. 6 it will be seen that the end pedestal members, as 19, are provided with inwardly extending flanges 36 which cooperate with similar flanges on the opposite side of the truck to prevent substantial axial movement of the axles. The axles 11 and 13 are connected by links 37 to the arm 38 of a shock absorber 39 which cushions the movements of the axle.

The central transverse bolster beam structure 30 is vertically of substantially the same depth as the side frames and of substantially a width equal to the spacing of the central pair of axle guiding pedestals 18. It comprises two main truss frames, one extending between the pair of pedestals 18 arranged in front and the other extending between the pair of pedestals 18 in rear of the axle 12, these being most clearly shown, respectively, in Figs. 4 and 5.

Each of these truss frames comprises a top chord 40, a pair of spaced central vertical web members 42, diagonal members 43 extending from the bases of the vertical members 42 to the tops of the side frames and further diagonal braces 44 extending from the bases of the vertical members 42 and converging at the top for joinder to the central portion of the top chord 40.

A pair of generous-sized gussets 45 overlap the opposite side of each of the truss frames at the top and are securely joined as by welding, to each of the top chords 40, vertical web members 42 and diagonals 44, while at the bottom, an opposite pair of gussets 46 commonly interconnects a chord 41, one of the vertical webs 42, and the diagonals 43 and 44 emanating from the base of said vertical web. At the top, gussets 47 connect the adjacent ends of chords 40 and diagonals 43 to each other and to the side frames and, at the bottom, gussets 48 connect the ends of the chord 41 to the side frames.

As shown in Figs. 1 and 5 the spaced bolster beam truss frames are interconnected at the top by plate 49 which is widened out at its ends which overlap and are secured to the top chords. The central portion of this plate is further reinforced by a heavy plate, as 50, which in turn carries the center bearing 51 cupped to receive a bearing member on the body of the car and having a central hole to receive the king pin.

The rear one of the two bolster truss frames, as shown in Fig. 5, is provided with additional diagonal members, as 52, extending from the tops of the vertical web members 42 to intermediate portions of the adjacent diagonals 43 and secured thereto by gussets 53. At their upper ends the diagonals 52 are secured to the central gussets 45.

At the front end of the truck, as seen in Fig. 3, the transverse frame interconnecting the side frames comprises a bottom chord 54 and a vertically deep trussed top chord beam 55 having its top face some distance below the tops of the side frames and diagonal members 56 extending from the central portion of the lower chord 54 laterally and upwardly to the points of connection of the top chord beam 55 to the side frames. Central gussets 57 on opposite sides of the end frame interconnect the bottom chord 54 and diagonals 56, gussets 58 connect the ends of the chord 54 to the side frames and gussets 59 connect the upper ends of the diagonals 56 to the side frames. The upper trussed chord beam 55 which supports one end of the internal combustion motor, is securely clamped at its ends to the front vertical beams 22 of the side frames by bolts 60 passing through lateral reinforced flanges on the end of the beam 55 and the plates 61 arranged on the outer sides of the vertical beams 22.

The transverse end frame for the rear end of the truck, as seen in Figs. 1, 2 and 9 is a truss structure of a depth in its central portion but slightly more than half the depth of the side frames in their main bodies, but since the rear ends of the side frames come to substantially a point, the end truss is constructed also to come to substantially a point at its ends where it is joined to the side frames. This end frame comprises a short top chord 62, see Figs. 2 and 9, terminating short of the sides and a long bottom chord 63 extending from side frame to side frame. The ends of the top chord 62 are connected to the bottom chord by the diagonals 64 extending between the adjacent ends of the chords and additional diagonals 65 extending from the ends of the top chord to the central portion of the bottom chord. A gusset 66 interconnects the adjacent ends of diagonals 65 and the bottom chord 63 and gussets 67 interconnect the ends of the top chord 62 and the adjacent ends of the diagonals 64 and 65.

At the ends of the rear end frame where it meets the side frame, special preformed gussets 69 of generally pyramidal form are provided to overlap flat sides of all four of the meeting members at these points, namely, the bottom chord 16 and diagonal member 21 of a side frame and the bottom chord 63 and diagonal 64 of the end frame, these gussets being secured, as by welding to all four of these meeting members and forming a neat and strong joinder therefor.

The bottom of the truck frame is reinforced by means strongly interbracing the side and end frames in their lower portions, which means is arranged to provide ample clearance for the free movement of the axles and the mounting of the power plant between the side frame and as low as possible in the frame.

Such means may comprise bracing beams, as 70, connecting at the front end of the truck, see Fig. 1, the central portion of the bottom chord of the end frame and the central portion of the bottom chord of the front bolster truss frame, respectively, with the bottom chords of the side frames in the region of the front axle and forming a substantially diamond shaped bracing structure when viewed in plan. A similar diamond shaped bracing structure is provided between the rear end frame, the rear bolster truss frame and the side frames. The adjacent ends of these bracing beams and the adjacent member of the side, end and bolster framing are joined by gussets in the manner already described in connection with those trusses.

Slightly rearwardly of the rear axle, the tops of the side frames are tied together by a cross member 97, Fig. 2, connected to the side frames by gussets 98 overlapping the top faces of the ends of said members and the rear diagonals 21 of the side frames and welded thereto.

At the rear end of the truck, suspension means for certain elements of the power plant are provided in the form of auxiliary beams 71 extending parallel to the side frames and supported a substantial distance below the tops of the main bodies thereof. At their front ends, these beams, which are strong multiple box section beams (see Fig. 5), constructed in the present instance of light gauge sheet metal, as is substantially all the rest of the truck frame structure, are joined as most clearly appears in Figs. 7 and 8, to the joint formed between the diagonals 43 and 52 of the bolster truss frame shown most clearly in Fig. 5.

The joint between these parts, as shown in Figs. 7 and 8 comprises the flanged gussets 53 interconnecting the diagonals 52 and 43, these gussets having the vertical flanges 73 arranged in the same vertical plane, and secured through said flanges with a third gusset 74 extending longitudinally and overlapping the end of the beam 71 and secured to the top and bottom chords thereof and through a lateral flange 75 thereon to a lateral flange extending from the corrugated web plate 76 of the beam 71. The gusset 73 is further secured to the gusset 53 adjacent the end of the beam 71 through a channel 77 of substantially the width of the chords of the beam which channel has its side wall opposite the gusset 74 connected to the opposite side of the beam 71 through a gusset 78 in a manner similar to the connection of the gusset 73 to the opposite side wall of the beam.

Finally, a top gusset 79 secured to the top of the beam, is secured to an upwardly extended portion of the gusset 74 and extended through between members 52 and 43 for securement to the gusset 53 at the other side of said members, see Fig. 7.

Thus a very strong joinder between the parts is provided and through joint parts which are open and accessible for ready joinder by spot welding.

At their outer ends the beams 71 are secured adjacent the opposite ends of the top chord 62, see Figs. 1 and 9, of the rear end frame with their tops in the plane of the top of said end frame, the joinder being to the adjacent gussets 67 through a channel and gussets similar to the channel 77 and gusset 78 and 74 at the opposite ends of the beams, see Fig. 8. Additionally the tops of the beams and the end frame top chord are joined by gussets 80 overlapping the adjoining ends of those parts. These gussets 80 may be extended by an angular portion overlapping the tops of the adjacent end of a diagonal 64 and secured thereto.

The manner in which the power plant is supported from the truck frame, the structure of which has been hereinbefore described in detail, will now be described. The power plant associated with the truck in the present instance is a power generating unit, the main elements of which comprise a motor, such as an internal combustion motor 81, a generator 82 for generating electric current driven from the crank shaft of the motor through shaft connection 83, and a storage battery 84, for supplying current when the generator is idle. These are the main elements of the power plant mounted on the truck and their arrangement on the truck between the side frames provides a very low truck construction, and they are so arranged longitudinally of the truck as to distribute their combined load substantially equally over all the axles, and in balanced relation to the center bearing.

The body of the motor 81 according to this arrangement is swung in the open space between the front transverse frame and the transverse bolster beam structure and the side frames and is supported at its opposite ends from the front end frame and the front bolster beam truss frame. To the front of the motor casing is rigidly secured a forward extension 84, Fig. 3, of V-shape in end elevation and this rests, through the intermediary of rubber block cushioning elements 85, upon the correspondingly inclined top faces of a pair of brackets 86 secured to the top of the trussed beam 55 of the end frame.

At the rear, and at opposite sides of the crank shaft the motor casing is provided with extensions 87 and these rest in motor supporting brackets 88 which are securely bolted to the gussets 46 and the frame members joined by said gussets, the bolts being so arranged that they do not pass through the frame members but between them, reinforcing members of a shape similar to the portions of the brackets 88 through which the bolts pass being arranged on the side of the frame members opposite the brackets and the bolts cooperating with these reinforcing members and brackets to clamp the brackets firmly in position on the frame. The brackets 88 are provided with rubber cushions 89 arranged on all sides between the pockets formed in the brackets to receive the projections from the motor. Thus it will be noted the motor is supported from the frame entirely through the rubber cushioning blocks and consequently the vibrations, thereof, are transmitted in but minor degree to the frame.

The generator 82 being relatively heavy is supported at the extreme opposite end from the heavy motor and is slung between the auxiliary beams 71 and secured thereto by bolts passing through lateral brackets from the generator and located below the beams, and the beams themselves.

Between the generator and the bolster beam structure considerable space is provided between the shaft 83 connecting the motor and generator and the auxiliary beams 71. This space is utilized in the present case to receive the storage batteries 83 which are supported in a frame, suspended from the auxiliary beams 71 by hangers, one of which is indicated in Fig. 7 by numeral 91 and all four of which are shown in the plan view of Fig. 2.

These battery supporting frames comprise transverse end beams, as 92, interconnected adjacent their opposite ends by pairs of longitudinal box section beams, one pair of which is indicated by numeral 93. These pairs of longitudinal beams are formed at the top with angular seats for receiving the bottoms of the batteries and retain them in place.

By thus suspending the batteries and generator between the auxiliary beams, 71, they are supported low in the truck frame and entirely between the side walls thereof. Similarly, the support of the motor in the manner described brings most of its bulk within the side frames and but the tops of the cylinders project above the top of the truck frame.

Other accessories of the power plant may be distributed on the truck to maintain the balanced relation. For example, the gas tank, not shown, may be attached to the rear frame of the truck to balance the radiator 94 supported at the front through side brackets 95 secured to the side frames of the truck and the sides of the radiator and additional bottom braces 96 connecting the central bottom portion of the radiator with the side frames.

The truck equipped as herein described is intended to be used with a driving truck of generally similar construction on which are mounted the driving motor or motors and the driving connections to the wheels. It will be understood, however, that many of the features of construction are applicable to both forms of trucks, and it is not desired to limit the invention to the particular type of truck herein specifically described, but to include within its scope all modifications and departures which fall clearly within the spirit and scope of the appended claims.

What I claim is:

1. A car truck side frame truss structure comprising top and bottom chords, spaced axle guiding pedestals connecting the top and bottom chords adjacent the opposite ends of the frame, central vertical webs interconnecting the chords, and diagonal webs interconnecting the chords and extending from the tops of the pedestals in opposite directions outwardly and downwardly to the bottom chord.

2. A car truck having vertical trussed side frame structures interconnected at the central portion and ends by transverse trussed structures, one of said end trusses being of a height less than the side trusses, and spaced longitudinal beams supported from the upper portion of said end truss and an intermediate portion of the central transverse truss.

3. A car truck having vertical trussed side frame structures interconnected centrally and at one end by transverse trusses of substantially the vertical depth of the side frame trusses, said transverse and side trusses being interconnected in the plane of their bottom chords by diagonal bracing of generally diamond shape, and supporting means associated with said central and end trusses for supporting a motor unit in the space formed by the longitudinal side and transverse trusses.

4. A car truck side frame truss structure comprising top and bottom chords, spaced axle guiding pedestals connecting the top and bottom chords and diagonal web members extending between the chords of the truss and interconnecting, respectively, the base of a pedestal associated with one axle with the top of a pedestal associated with an adjacent axle and interconnecting the tops of the end pedestals with the ends of the truck frame.

5. A car truck having vertical side frames comprising top and bottom chords interconnected by spaced axle guiding pedestals and diagonal trussing, end trusses interconnecting the side trusses, and an intermediate bolster beam truss interconnecting the central portions of the side frames, and generally diamond shaped bracing in plan interconnecting the lower chords of the end, side and bolster beam trusses.

6. A car truck comprising longitudinal side frames and end and intermediate transverse frames, interconnecting the side frames, said side frames being of open trussed construction and built up in large part of box section beams of light gauge sheet metal having edge faces on all sides suitable for the entry of spot welding tools whereby these faces may be readily joined to adjoining beams through gusset members.

7. A car truck comprising vertically deep side frames of truss form having top and bottom chords, end and intermediate frames interconnecting said side frames, axle guiding pedestals interconnecting the top and bottom chords of the side frames and guiding the axle bearings, axles mounted in said bearings and offset downwardly n their central portions, whereby a vertically deep space is provided between the side frames and the tranverse connecting frames and the offset axles to receive various parts of the power plant and permit their location in main part below the level of the top of the side frames.

8. A car truck comprising vertically deep side frames of truss form, a central transverse bolster beam structure of substantially the depth of the side frames interconnecting them, an end beam interconnecting the side frames some distance below their tops and having a bearing to support one end of an internal combustion motor slung between the side frames and said end and bolster beams and extending substantially from end beam to bolster beam and for the full depth of the side frames and bearings for supporting the other end of the motor mounted on the lower portion of said transverse bolster beam structure.

9. A car truck having vertically deep side frames of truss form carrying wheel axle pedestals adjacent the ends thereof, a central bolster beam structure of truss form and of substantially the depth of the side frames, end frames of truss form, auxiliary beams paralleling the side frames, means to support one end of the auxiliary beams on the bolster beam structure, and means to support the other end on an end frame, said auxiliary beam being arranged substantially below the tops of the side frames and adapted to carry elements of a power plant below the level of the top of the truck and on opposite sides of an axle.

10. A car truck having vertically deep side frames, end frames and a central bolster frame interconnecting the side frames, an internal combustion motor supported in the space between the side frames, the bolster frame and one end frame so as to project but a relatively short distance above the level of the side frames, adjacent one end of the truck, and other elements of the power plant including a generator driven by said motor and a storage battery arranged in balanced relation to the motor on the opposite end of the truck.

11. A car truck having vertically deep side frames, end frames and a central bolster frame interconnecting the side frames, the space between the side frames and the central and one end frame being substantially free, an internal combustion motor supported in said space, the bolster frame and the opposite end frame being interconnected by auxiliary beams parallel to the side frames but below the tops of the same, and a generator and storage battery supported by said auxiliary beams.

12. A car truck comprising side frames and a central bolster beam and an end frame interconnecting the side frames, spaced motor supports mounted on said bolster beam in the lower portion thereof, said end frame including a deep beam below the top of the side frames serving as a motor support.

13. A car truck having vertically deep side frames of trussed structure and an end frame interconnecting the side frames, said end frame comprising upper and lower beams and diagonals extending from the center of the lower beam to the point of connection of the upper beams to the side frames.

14. A car truck having vertically deep side frames of trussed structure, and a central transverse bolster beam structure interconnecting the side frames, said bolster beam structure comprising slightly longitudinally spaced truss structures including a plurality of angular shaped elements joined together to form the vertical posts, the diagonals and the chords of the truss, the bolster beam structure being of the vertical depth of the side frames and connected together and to the side frames by a continuous plate structure extending from side to side at the top and supporting the center bearing.

15. A car truck having vertically deep side frames of trussed structure, and a central transverse bolster beam structure interconnecting the side frames including a pair of slightly longitudinally spaced truss frames, each of substantially the vertical depth of the side frames, and each comprising upper and lower chords, box section vertical members extending between them in central location, and box section diagonal members extending from the bases of said vertical members to the tops of the side frames, all of said members being constructed of light gauge sheet metal spot welded together.

16. A car truck having vertically deep side fames of trussed structure, and a central transverse bolster beam structure interconnecting the side frames, including a truss structure vertically of the depth of the side frames and embodying top and bottom chords, centrally arranged vertical members interconnecting the chords, diagonal members extending from the bases of the vertical members to the tops of the side frames and additional diagonal members extending from an intermediate portion of said first-named diagonals to the tops of said vertical members, the joint between said sets of diagonals forming anchorages for the ends of auxiliary longitudinally extending beams.

17. In a car truck, a truss structure comprising top and bottom chords interconnected by spaced vertical members and diagonal members extending from the bases of the vertical members to a common point centrally of the top chord, and a pair of gussets, each connecting all of said vertical and diagonal members to the top chord.

18. In a car truck, a transverse frame truss comprising upper and lower chords, vertical and diagonal members interconnecting said chords, diagonal members extending between said first-named diagonal members and one of said chords, said diagonals being joined by a pair of gussets, longitudinal members having their ends abutting the joints between said diagonals and secured to the joint through said pairs of gussets.

19. A car truck having deep vertical side frames of truss structure, and longitudinally spaced transverse frames interconnecting the side frames, auxiliary beams paralleling the side frames and supported by certain of said transverse frames at a level below the top of the side frames, and a battery supporting frame suspended from said auxiliary beams.

20. A car truck having vertically deep side frames of truss structure, having
chords interconnected by a
and diagonal members
of one pedestal with
chord terminating
endmost pedest
ing therebe
said pedo
tom